US004001747B2

United States Statutory Invention Registration [19]

[11] Reg. Number: H1747

[45] Published: Sep. 1, 1998

Saeki et al.

[54] OBJECT LOADING DEVICE

[75] Inventors: Yutaka Saeki, Kakogawa; Hiroki Sawada, Hyogo, both of Japan

[73] Assignee: Okura Yusoki Kabushiki Kaisha, Kakogawa, Japan

[21] Appl. No.: 699,986

[22] Filed: Dec. 12, 1996

[51] Int. Cl.[6] ..... B65B 35/30

[52] U.S. Cl. ..... 53/443

[58] Field of Search ..... 53/139.5, 175, 53/244, 245, 248, 447, 448, 472, 535, 536, 540

[56] References Cited

U.S. PATENT DOCUMENTS

| | | | |
|---|---|---|---|
| 2,282,908 | 5/1942 | Thompson | 53/472 X |
| 2,647,670 | 8/1953 | Cox | 53/248 X |
| 2,821,828 | 2/1958 | Kernen | 53/248 X |
| 3,120,249 | 2/1964 | Keene | 53/536 X |
| 3,509,688 | 5/1970 | Hartbauer et al. | 53/536 |
| 3,641,735 | 2/1972 | Daily et al. | 53/540 X |
| 3,783,584 | 1/1974 | Rauser | 53/248 X |
| 3,890,762 | 6/1975 | Ernst et al. | 53/472 X |
| 4,045,940 | 9/1977 | White et al. | 53/447 |
| 4,054,015 | 10/1977 | Rowell | 53/447 X |
| 4,159,761 | 7/1979 | Egee et al. | 53/540 X |
| 4,520,614 | 6/1985 | Aykut et al. | 53/540 |
| 4,781,011 | 11/1988 | Prakken | 53/247 X |
| 5,263,302 | 11/1993 | Hauers et al. | 53/540 X |
| 5,502,949 | 4/1996 | Main et al. | 53/448 |

FOREIGN PATENT DOCUMENTS

| | | | |
|---|---|---|---|
| 1509299 | 9/1989 | U.S.S.R. | 53/248 |

*Primary Examiner*—Charles T. Jordan
*Assistant Examiner*—Meena Chelliah
*Attorney, Agent, or Firm*—The Morrison Law Firm

[57] ABSTRACT

An object loading device includes an object conveyor for conveying objects to a hopper at one end of the object conveyor. A container conveyor conveys containers to a position underneath the hopper. Objects are discharged from the end of the object conveyor onto closed shutters in the hopper. A bottom plate elevator lifts the bottom plate of a container under the hopper to an upper position. The shutters slide open and the objects gently drop onto the elevated bottom plate of the container. The shutters are then closed and bottom plate elevator lowers the bottom plate to the bottom end of the container. The container conveyor then moves the container with the objects away from the position underneath the hopper. A further embodiment includes padded buffer rollers between which objects pass on their way to the container.

22 Claims, 11 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OBJECT LOADING DEVICE

BACKGROUND OF THE INVENTION

The present invention relates to an object loading device for loading objects into a container.

Referring to FIG. 12*a*, a conventional object loading system 10 for loading objects into a container has an object conveyor 2 for conveying objects 1 toward a frame-shaped hopper 3 in an object conveying direction indicated by arrow 6. Hopper 3 is located at a forward end of object conveyor 2. A container conveyor 5 conveys containers 4 to a position underneath hopper 3. Container conveyor 5 passes below hopper 3. Container conveyor 5 conveys containers 4 in a container conveying direction indicated by arrow 7. The container conveying direction is substantially perpendicular to the object conveying direction. Each container 4 is formed in the shape of a box having continuous side walls with a bottom plate and an open top.

The process of loading objects into container 4 begins by conveying container 4 to a position underneath hopper 3 on container conveyor 5. Objects 1 are conveyed toward hopper 3 by object conveyor 2.

Referring now to FIG. 12*b*, at the forward end of object conveyor 2, objects 1 fall off of object conveyor 2, traveling directly through hopper 3.

Referring now to FIG. 12*c*, objects 1 fall onto a bottom plate 8 of container 4.

Referring to FIG. 12*d*, upon completion of loading objects 1 into container 4, container conveyor 5 moves container 4, which now contains objects 1, to an area remote from hopper 3 while bringing a new container 4 to the position underneath hopper 3, thereby preparing new container 4 for a next cycle of object 1 loading.

In the above described process of conventional object loading system 10, objects 1 fall directly from object conveyor 2 onto bottom plate 8 through hopper 3. Objects 1 are discharged from object conveyor 2 by the conveying motion of object conveyor 2. Objects 1 fall a long distance from a conveying surface of object conveyor 2 to the bottom plate of container 4. For these reasons, objects 1 tend to crash onto the bottom plate of container 4 or other objects 1 already placed thereon. Such an impact often causes damage to objects 1, such as, for example, dents and tears in cases where object 1 is a box or a carton, and breakage in cases where object 1 is a bottle or other glass or plastic container.

OBJECTS AND SUMMARY OF THE INVENTION

It is an object of the present invention to provide an object loading device which overcomes the problems of the prior art.

It is a further object of the present invention to provide an object loading device which is capable of lowering objects slowly onto the bottom plate of a container, thereby protecting the objects from damage and breakage.

It is another object of the present invention to provide an object loading device with cushioned surfaces which reduce the force of impact of objects which are to loaded.

Briefly stated, an object loading device includes an object conveyor for conveying objects to a hopper at one end of the object conveyor. A container conveyor conveys containers to a position underneath the hopper. Objects are discharged from the end of the object conveyor onto closed shutters in the hopper. A bottom plate elevator lifts the bottom plate of a container under the hopper to an upper position. The shutters slide open and the objects gently drop onto the elevated bottom plate of the container. The shutters are then closed and bottom plate elevator lowers the bottom plate to the bottom end of the container. The container conveyor then moves the container with the objects away from the position underneath the hopper. A further embodiment includes padded buffer rollers between which objects pass on their way to the container.

According to an embodiment of the present invention, there is provided, an object loading device for loading objects into containers with an open top, comprising: an object conveyor, a hopper at an end of the object conveyor, the hopper receiving objects conveyed by the object conveyor, at least one flap movably mounted on a bottom portion of the hopper, the flap being moveable between a closed position and an open position to selectively hold and release the objects in the hopper, respectively and means for positioning a container below the hopper to receive the objects.

According to another embodiment of the present invention, there is provided, an object loading device for loading objects into a container having an open top, comprising: an object conveyor, a hopper mounted at an end of the object conveyor, the hopper receiving objects conveyed by the object conveyor, a first roller and a second roller rotatably supported along a bottom of the hopper, the first roller and the second roller having a cushioning material on exterior surfaces of the first and the second rollers, a distance between the first and second rollers being large enough for the objects to pass between them and a container conveyor.

According to another embodiment of the present invention, there is provided, an object loading device for loading objects into containers having a moveable bottom plate and an open top, comprising: an object conveyor, a hopper mounted at a forward end of the object conveyor, the hopper receiving objects conveyed by the object conveyor, a container conveyor, means for holding a container on the container conveyor in a receiving position aligned below the hopper and a lifting mechanism which lifts the moveable bottom plate toward the hopper when the container is in the position aligned below the hopper.

According to another embodiment of the present invention, there is provided, a method of loading objects into a container comprising the steps of: transporting the objects to a hopper, retaining the objects in the hopper, positioning the container underneath the hopper, raising a bottom plate of the container toward a raised position underneath the hopper, releasing the objects through an opening on the bottom of the hopper onto the bottom plate in its raised position, lowering the bottom plate back down to a bottom of the container.

According to still another embodiment of the present invention, there is provided, a method of loading objects into a container comprising the steps of: positioning the container underneath a hopper, raising a bottom plate of the container toward the hopper, transporting objects to the hopper, transporting objects through cushioned rollers in the hopper and lowering the bottom plate to a bottom of the container.

The invention according to one embodiment discloses an object dumping system for dumping objects into a box-shaped container with an open top, the object dumping system includes an object conveying means for conveying the aforementioned objects. A hopper at the end of the object conveying means receives the objects dumped from the object conveying means. Shutters at the bottom of the hopper are opened and closed during the cycle. A container conveying means conveys the containers to a position aligned underneath the hopper.

The invention according to another embodiment discloses an object dumping system for dumping objects into a box-shaped container with an open top. The object dumping system has an object conveying means for conveying the aforementioned objects. A hopper at the end of the object conveying means receives objects dumped from the object conveying means. A first buffer rotor having a cushioned buffer portion therearound is rotatably supported at the inner bottom of the hopper, at a location near the end of the object conveying means. First buffer rotor extends parallel to the end of the object conveying means. A second buffer rotor also having a cushioned buffer portion therearound is rotatably supported at the inner bottom of the hopper, at a distance from the first buffer rotor sufficient to permit the objects to pass therebetween. A container conveying means conveys the aforementioned containers to a position underneath the hopper for receiving the objects which pass between the first and second buffer rotors.

The invention according to another embodiment includes a container with a bottom plate that moves upward to receive the objects without the objects falling a substantial distance when the container is at a loading position. Upon completion of loading, the bottom plate moves downward into position in the container, lowering the objects into the container without dropping them. The container is moved away from the loading position by a container conveyor, while a new container is moved into the loading position.

According to an embodiment of the invention, objects discharged from an object conveying means first fall a short distance upon shutters at the bottom of a hopper. The shutters are gently opened and the objects fall a short distance into a container. In this manner the objects are protected from physical damage because the impact of a direct discharge from the conveying means to the container is reduced.

According to another embodiment of the invention, objects discharged from an object conveying means contact first and second buffer rotors. A cushioned exterior of the buffer rotors reduces the impact of the objects onto the buffer rotors. The objects then fall a short distance from the buffer rotors into a container. In this manner the objects are protected from physical damage because the impact of a direct discharge from the conveying means to the container is reduced.

According to another embodiment of the invention, a bottom plate of a container conveyed to the position underneath a hopper is raised by an elevating means. Objects in the hopper at the end of the object conveying means are released onto the bottom plate of the container. The drop distance of the objects from the hopper to the bottom plate of the container is greatly reduced because the bottom plate is raised. The objects are protected from damage because the reduced distance lowers the force of impact on the objects hitting the bottom plate of the container. After all objects are loaded onto the bottom plate, the bottom plate is lowered into the container and the container is transported away from the hopper.

The above, and other objects, features and advantages of the present invention will become apparent from the following description read in conjunction with the accompanying drawings in which like reference numerals designate the same elements.

DETAILED DESCRIPTION OF THE PREFERRED EMBODIMENTS

Figure 1A:
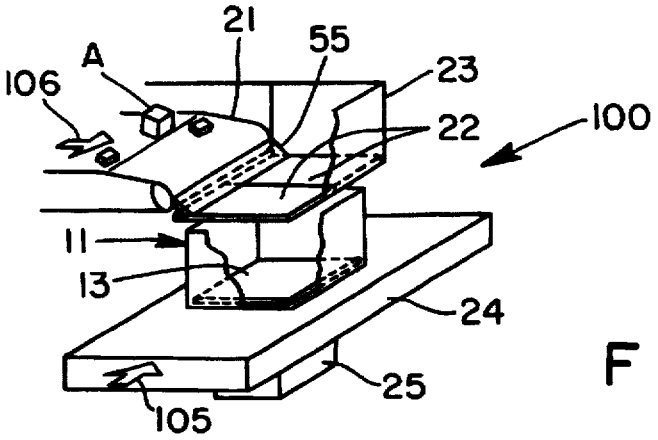
FIG. 1*a* shows an object loading device according to an embodiment of the invention at the beginning of a loading cycle.

Referring to FIG. 1*a*, an object loading device 100 includes a container conveyor 24, for conveying a container 11 to a object loading position aligned underneath a hopper 23. Container conveyor 24 moves container 11 in a container conveying direction indicated an by arrow 105. An object conveyor 21 conveys objects A toward hopper 23. Object conveyor 21 discharges objects A into hopper 23. Objects A enter hopper 23 at substantially the same level as object conveyor 21, whereby objects A are not subjected to a substantial drop or fall. Object conveyor 21 conveys objects A in an object conveyor direction indicated by arrow 106. Hopper 23 is located at a forward end of object conveyor 21.

Hopper 23 includes shutters 22 mounted along a bottom portion of hopper 23 for holding and releasing objects A.

Container conveyor 24 includes a bottom plate elevator 25 for lifting a bottom plate 13 of container 11. Bottom plate 13 is movable in a vertical direction from the bottom end of container 11 to the top end of container 11.

To load objects A into container 11, container conveyor 24 first moves container 11 to object loading position underneath hopper 23. Although container conveyor is shown as a belt, the preferred embodiment uses rollers having a space underneath hopper 23 which provides bottom plate elevator 25, mounted below container conveyor 24, access to bottom plate 13 of container 11, which rests on top of container conveyor 24.

Figure 1B:
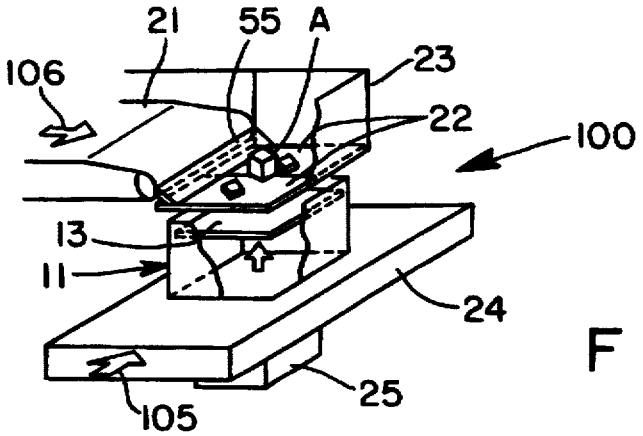
FIG. 1*b* shows the object loading device of FIG. 1*a* with the objects loaded in the hopper.

Referring to FIG. 1*b*, bottom plate elevator 25 lifts bottom plate 13, of container 11, to a top end of container 11.

Figure 1C:
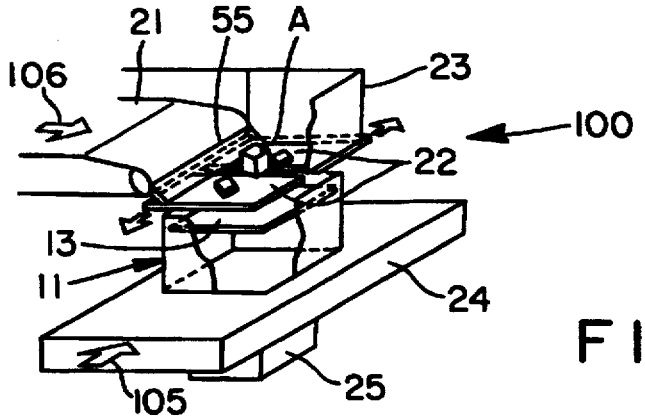
FIG. 1*c* shows the object loading device of FIG. 1*a* with the shutters partially opened.

Referring to FIG. 1*c*, shutters 22 begin to open by sliding out from under the side panels of hopper 23. This sweeps objects A onto bottom plate 13.

Figure 1D:
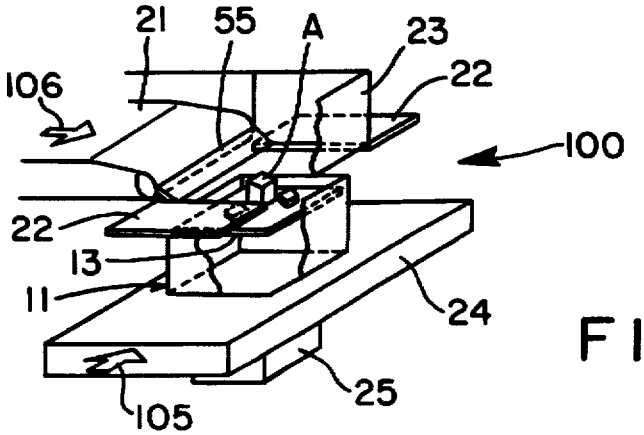
FIG. 1*d* shows the object loading device of FIG. 1*a* with the shutters fully open and objects on the bottom plate of container.

Referring to FIG. 1*d*, shutters 22 slide completely under the side panels of hopper 23. Objects A are blocked from traveling with the shutters by the side panels of hopper 23. When the shutters slide completely outside of hopper 23, the bottom of hopper 23 is open and all objects A are shifted to bottom plate 13.

Figure 1E:
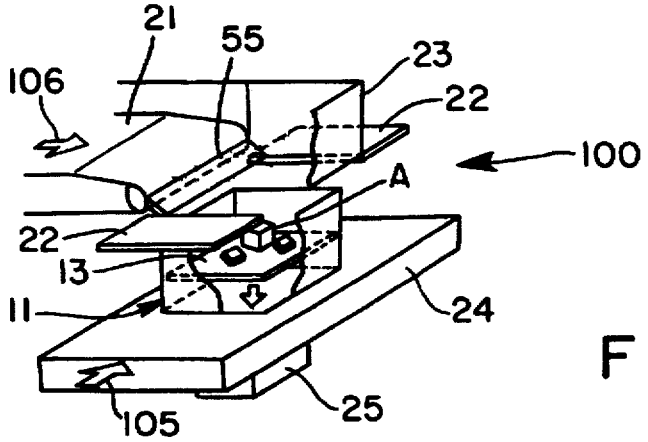
FIG. 1*e* shows the object loading device of FIG. 1*a* with the bottom plate of the container being lowered with objects in the container.

Referring to FIG. 1*e*, once objects A are on bottom plate 13, bottom plate elevator 25 lowers bottom plate 13 to the bottom end of container 11.

Figure 1F:
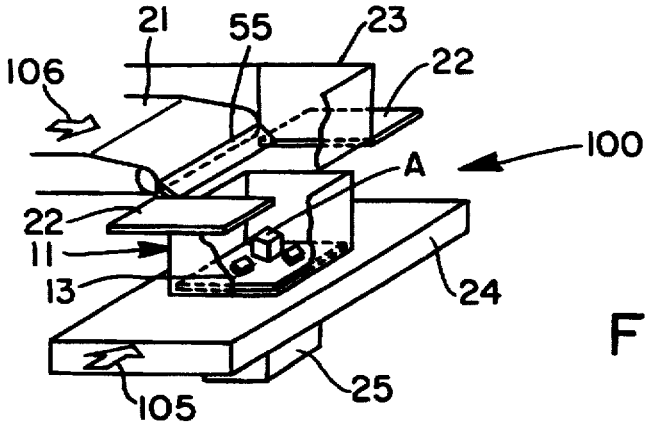
FIG. 1*f* shows the object loading device of FIG. 1*a* with the bottom plate of the container at the bottom of the container.

Referring to FIG. 1*f*, bottom plate 13 is completely lowered to the bottom of container 11 with objects A.

Figure 1G:
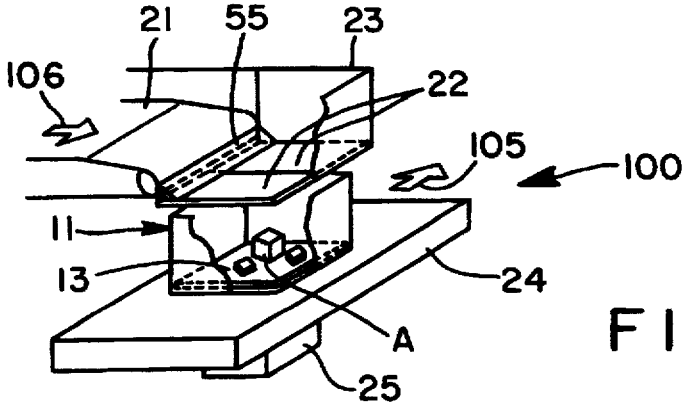
FIG. 1*g* shows the object loading device of FIG. 1*a* with the objects in the container and the shutters closed.

Referring to FIG. 1*g*, once bottom plate 13 is completely lowered, shutters 22 are slid back into place, ready to retain the next load of objects A from object conveyor 21 in hopper 23.

Figure 1H:
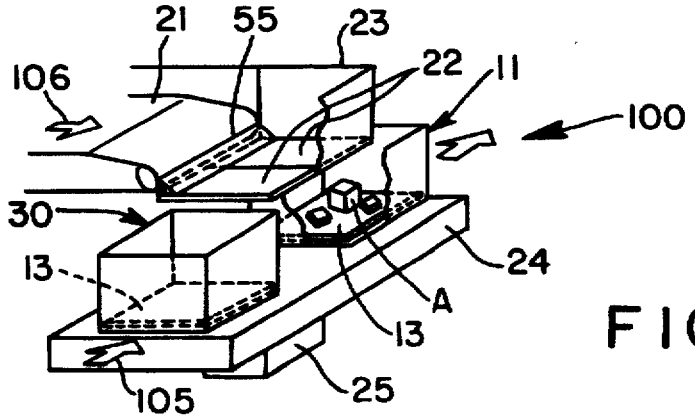
FIG. 1*h* shows the object loading device of FIG. 1*a* with the container holding the objects just loaded being conveyed away and a new container being conveyed underneath the hopper ready for another load of objects.

Referring to FIG. 1*h*, container conveyor 24 moves container 11 away from the position underneath hopper 23 and moves a new container 30 to the object loading position underneath hopper 23 in preparation for the next load of objects A.

In a preferred embodiment of the invention, objects A begin loading into hopper 23 whether or not container 11 has reached alignment below hopper 23. This permits substantially continuous loading of objects A without waiting for the illustrated alignment of container 11 and hopper 23.

Figure 2:
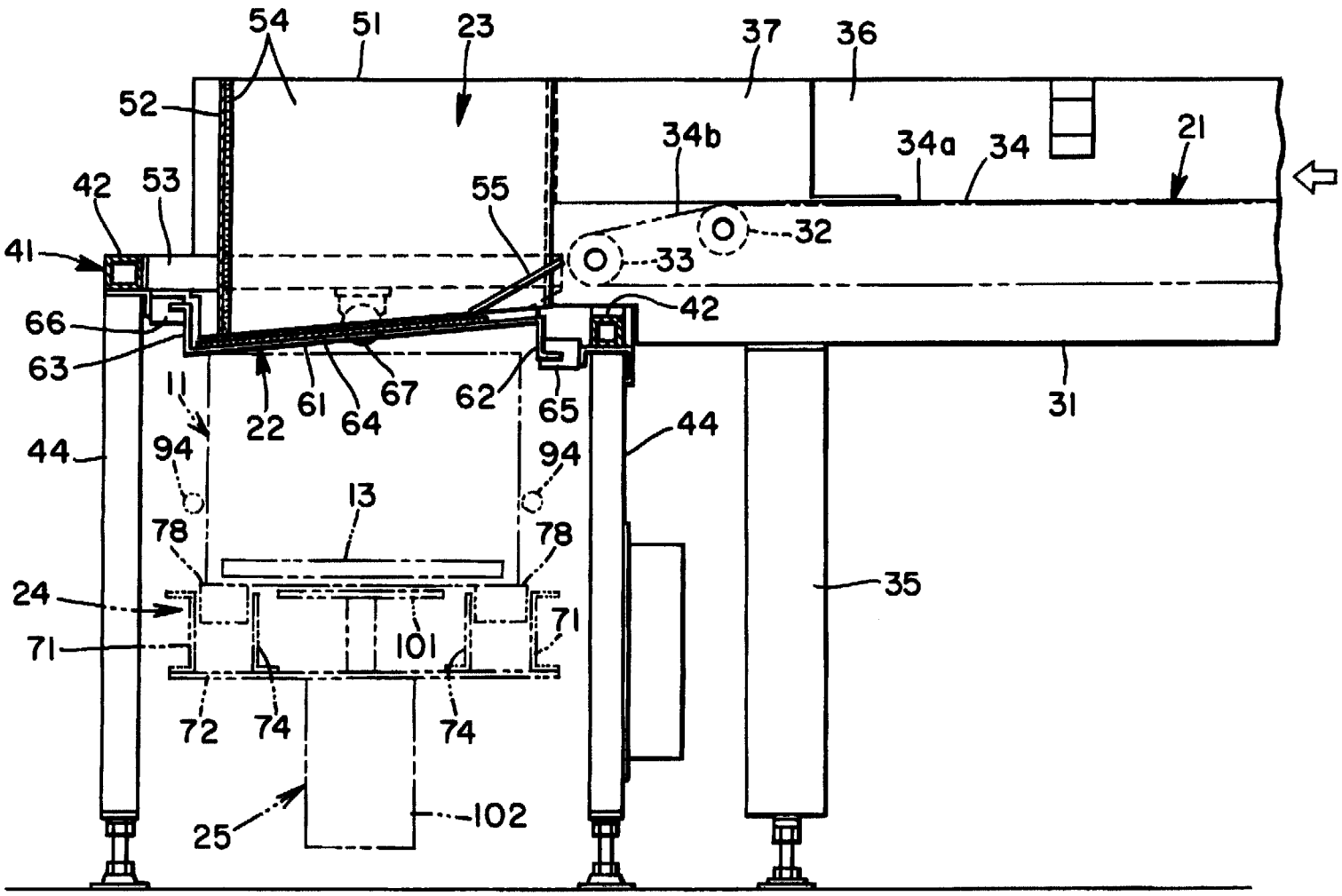
FIG. 2 is a sectional view of the object loading device of FIG. 1*a* showing the end of the object conveying means with the hopper.

Referring to FIG. 2, object conveyor 21 is a belt conveyor using an endless belt 34. A pair of conveyor frames 31 are mounted along the sides of endless belt 34. Rollers (not shown in FIG. 2) are rotatably supported between conveyor frames 31 at the base end of the object conveying path. End rollers 32 and 33 are positioned near the forward end of the object conveying path. End rollers 32 and 33 are also rotatably supported between conveyor frames 31.

Endless belt 34 wraps around the rollers at the base end of the object conveying path and around end rollers 32 and 33. Endless belt 34 has a horizontal portion 34*a* and an inclined portion 34*b*. Inclined portion 34*b* extends between end rollers 32 and 33. Horizontal portion 34*a* extends from end roller 32 to the base end of the object conveying path.

Conveyor frames 31 are supported by legs 35. Each conveyor frame 31 has a pair of guide plates 36 and a pair of supporting plates 37 both of which project upward along the sides of conveyor frame 31. Supporting plates 37 are closest to the forward end of the object conveying path. Hopper 23 is fixedly connected to the front of supporting plates 37.

Shutters 22, mounted at the bottom of hopper 23, include shutter plates 61 which face the bottom of hopper 23. Shutter plates 61 are inclined downward in the object conveying direction. Each shutter plate 61 has L-shaped guide projections 62 and 63. Guide projection 62 project downward from the end of shutter plate 61 adjacent to conveyor 21. Guide projection 63 project upward from the other end of shutter plate 61. Each shutter plate 61 also includes a shutter plate cushion 64 made of a soft and pliable material, such as for example, a sponge or foam rubber, which is attached to an upper surface of shutter plate 61.

A hopper frame 41 supports hopper 23. A pair of long frame portions 42 are mounted substantially perpendicular to the object conveying direction. A plurality of legs 44 are attached to long frame portions 42. Each long frame portion 42 of hopper frame 41 has guide rails 65 and 66 for respectively receiving guide projections 62 and 63 of corresponding shutter 22. Guide projections 62 and 63 are slidably fitted in respective guide rails 65 and 66.

Container conveyor 24 includes a pair of conveyor frame members 71 mounted parallel to each other and perpendicular to the object conveying direction. A pair of auxiliary frame members 74 are mounted on cross joints 72 below hopper 23. Cross joints 72 connect conveyor frame members 71. Each auxiliary frame member 74 faces an inner surface of a corresponding conveyor frame member 71. A plurality of short rollers 78 are rotatably mounted between each auxiliary frame member 74 and the inner surface of the corresponding conveyor frame member 71. Short rollers 78 are arranged along the container conveying direction.

Bottom plate elevator 25 includes an elevating board 101 mounted between auxiliary frames 74 at the object receiving position. An elevator air cylinder 102, mounted under conveyor frame members 71, raises and lowers elevating board 101 above and below the top surface of short rollers 78. When container 11 is positioned above bottom plate elevator 25, the movement of elevating board 101 raises and lowers bottom plate 13.

Figure 3:
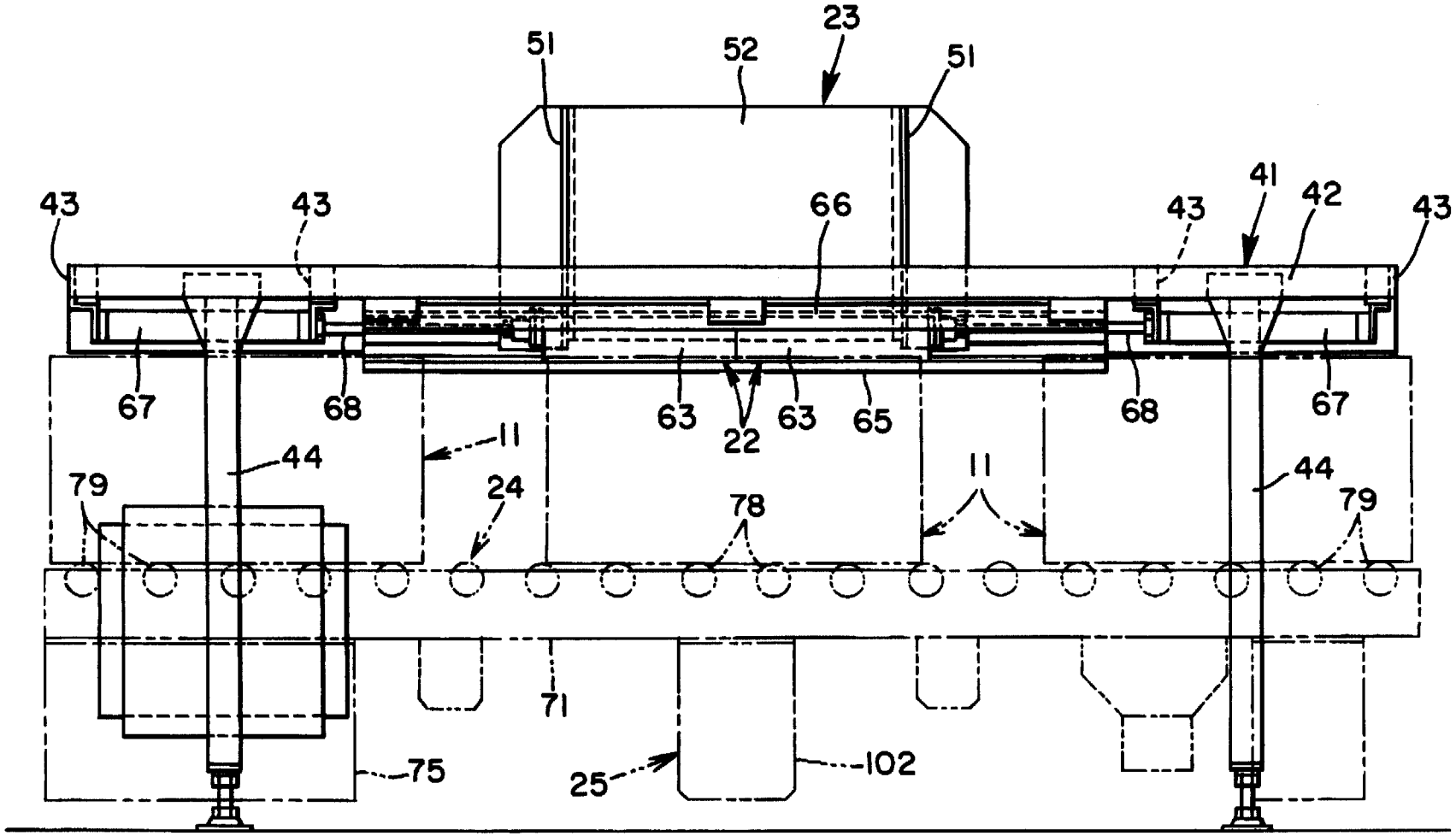
FIG. 3 is a front view of the object loading device of FIG. 1*a*.

Referring to FIG. 3, long frame portions 42 of hopper frame 41 are connected by a plurality of cross joints 43. The rectangular frame of hopper frame 41 is substantially parallel to horizontal portion 34*a* of endless belt 34.

A pair of shutter air cylinders 67 are mounted on cross joints 43 at both lateral sides of hopper frame 41. Air cylinders 67 push or pull operation rods 68 to close or open shutters 22, respectively.

Figure 4:
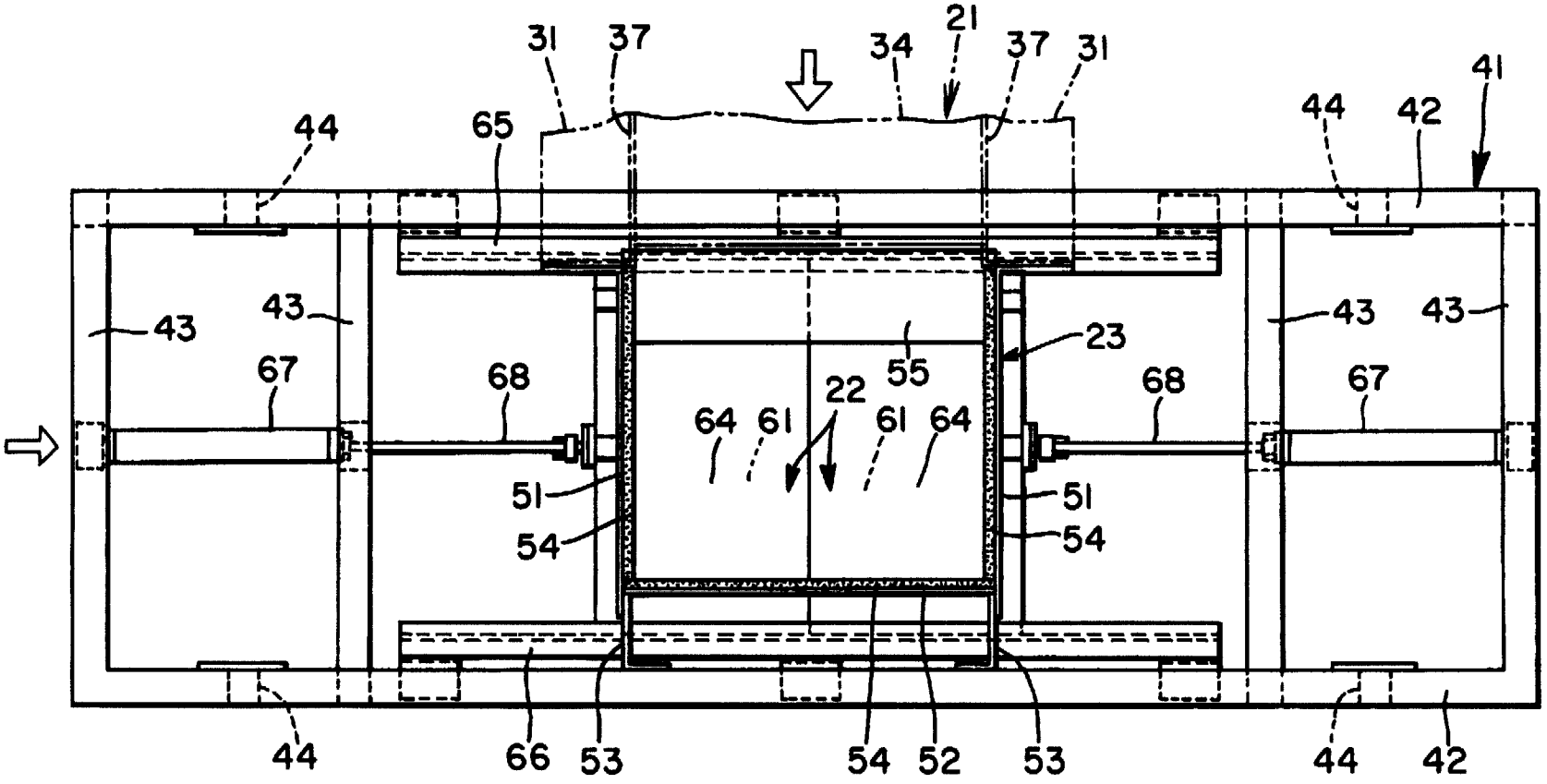
FIG. 4 is a top view of the sectional view of FIG. 2

Referring to FIG. 4, hopper 23 is U-shaped. A pair of side panels 51 extend parallel to both sides of conveyor 21. An end panel 52 faces the end of the object conveying path of conveyor 21. Of the two ends of each side panel 51, the end adjacent to conveyor 21 is attached to supporting plate 37, while the other end is attached to long frame portion 42 of hopper frame 41 by fittings 53. A hopper cushion 54 covers the entire inner surface of side panels 51 and end panel 52. The lower end of each side panel 51 inclines downward in the direction objects A are conveyed.

Objects A are transported from conveyor 21 through a chute 55 onto shutters 22. Chute 55, mounted between side panels 51 of hopper 23, is inclined downward in the object conveying direction of objects A.

Figure 5:
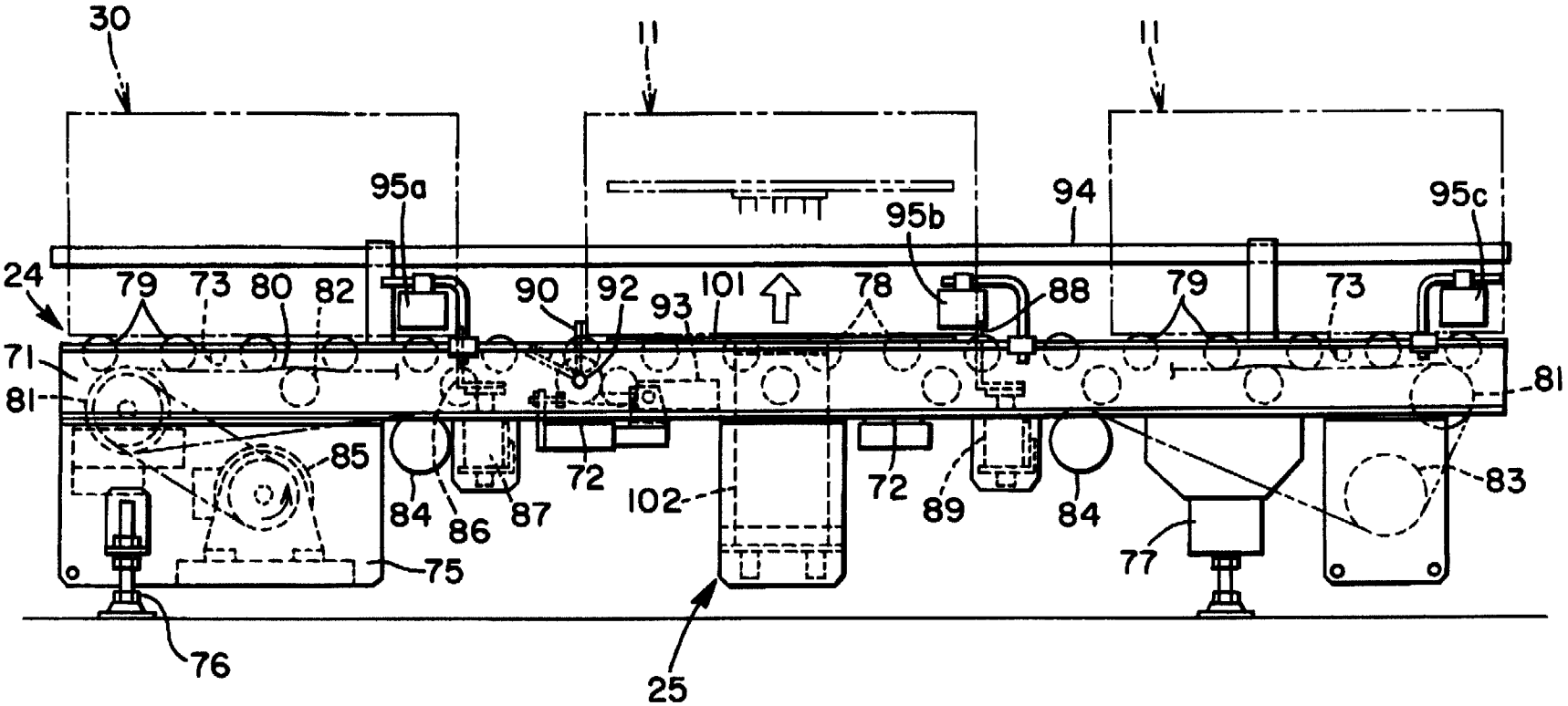
FIG. 5 is a front view of a container conveyor of the object loading device of FIG. 1*a* for conveying containers.

Referring to FIG. 5, a box 75 is mounted under one end of container conveyor 24. Legs 76 and 77 support box 75 and the portion near the other end of container conveyor 24, respectively.

A plurality of long rollers 79, arranged along the direction in which containers are conveyed, are rotatably mounted between conveyor frame members 71 where no auxiliary frame members 74 are mounted between conveyor frame members 71 on container conveyor 24.

A pulley 81 is rotatably mounted at each end of object conveyor 24. Running along the inner surface of corresponding conveyor frame members 71, an endless V-belt 80 is wrapped around pulleys 81. Endless V-belt 80 is also supported on a plurality of upper side guide pulleys 82 disposed between short rollers 78 and long rollers 79. A tension pulley 83 below conveyor frame members 71 maintains a required tension on V-belt 80. Underside guide pulleys 84 support the return run of endless V-belt 80. Guide rollers 82 press the upper portion of V-belt 80 against the underside of rollers 78 and 79 so that rollers 78 and 79 rotate when V-belt 80 is revolved about pulleys 81.

A motor 85, mounted in box 75, rotates one of pulleys 81. The rotation of pulley 81 causes V-belt 80 to revolve about pulleys 81. Movement of the upper run of V-belt 80 rotates rollers 78 and rollers 79. A container resting on top of rotating rollers 78 and 79 moves in the container conveying direction.

A next container stopper 86 is located immediately behind the object receiving position of container conveyor 24, in the transport direction of containers 11. A next container air cylinder 87 raises and lowers next container stopper 86 above and below the container conveying surface. Next container air cylinder 87 is attached to the underside of conveyor frame members 71.

A downstream stopper 88 at the downstream side of (ahead of) the object receiving position stops the current container 11 in the object receiving position. A downstream air cylinder 89 raises and lowers downstream stopper 88 above and below the container conveying surface. Downstream air cylinder 89 is attached through a connecting member to the underside of conveyor frame members 71.

An upstream stopper 90 clamps the upstream end of the one of containers 11 positioned to receive the current load of objects. Upstream stopper 90 is rotatably supported by a shaft 92 on one of the cross joints 72 between a pair of supporting members 91. An upstream air cylinder 93 rotates upstream stopper 90 between an up position, above the container conveying surface, and a down position, below the container conveying surface. Upstream air cylinder 93 is also mounted on conveyor frame members 71.

A guide rail 94 on an upper part of each conveyor frame member 71 guides the lateral sides of containers 11. First, second, and third detecting means **95*a*, 95*b*, and 95*c* are mounted immediately behind the object receiving position, at the downstream side of the object receiving position, and at the end of the container conveying path, respectively. Detecting means 95*a*, 95*b* and 95*c* may be of the same or different types. In the preferred embodiment detecting means 95*a*, 95*b* and 95*c*** are reflection type photo-sensors.

Figure 6:
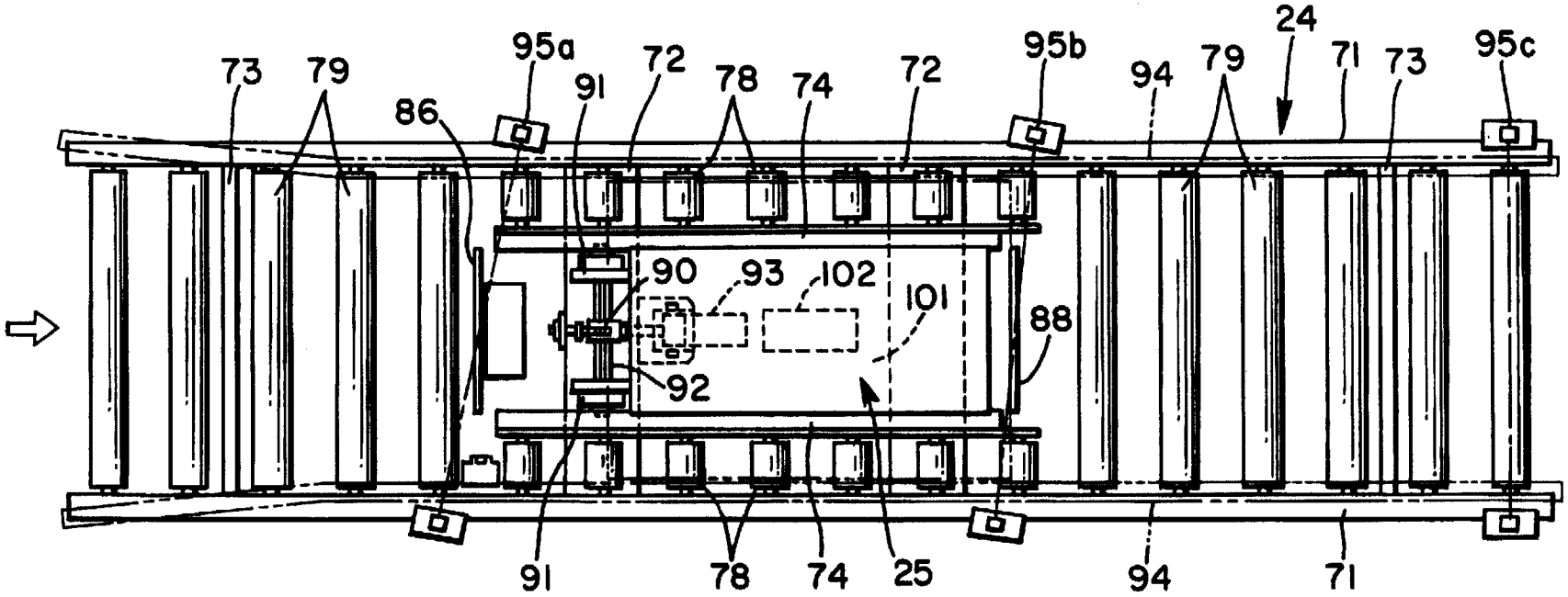
FIG. 6 is a top view of said container conveyor.

Referring to FIG. 6, plate-shaped cross joints 72 and rod-shaped cross joints 73 are connected to hold conveyor frame members 71 rigidly in position parallel to each other. Plate-shaped cross joints 72 are affixed between conveyor frame members 71 near the center of container conveyor 24. First and second auxiliary frame members 74 are mounted parallel to the conveying direction between conveyor frame members 71 alongside bottom plate elevator 25. Rod-shaped cross joints 73 are near the ends of conveyor 24, where no auxiliary frame members are mounted between conveyor frame members 71.

A first set of short rollers 78 are rotatably mounted between one conveyor frame member 71 and its adjacent auxiliary frame member 74. Similarly, a second set of short rollers 78 are rotatably mounted between the other conveyor frame member 71 and its adjacent auxiliary frame member 74. Short rollers 78 support the edges of a container (not shown in FIG. 6) as it passes over bottom plate elevator 25. Both sets of short rollers 78 are preferably driven by contact with the upper run of a V-belt (not shown).

Returning momentarily to FIG. 5, in order to drive both sets of short rollers 78, V-belt 80, shown in the figure, is preferably duplicated at the opposite side of container conveyor 24.

Figure 7:
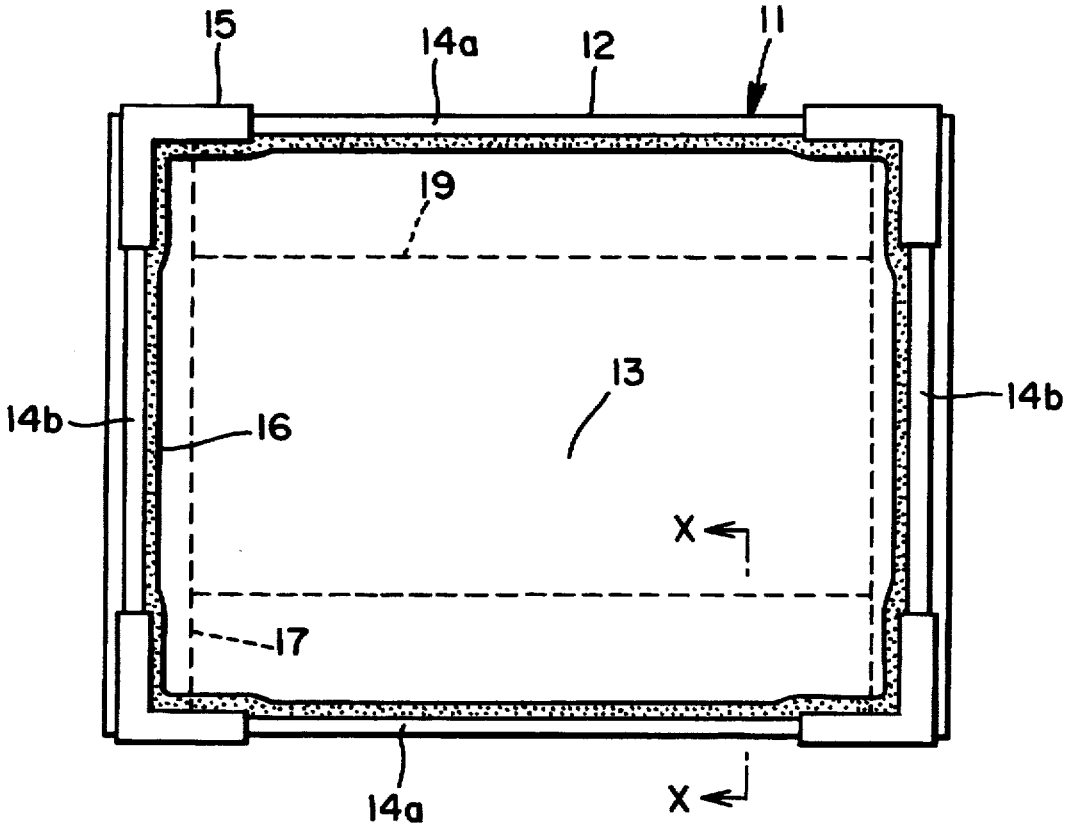
FIG. 7 is a top view of a container.

Referring to FIG. 7, container 11 has a frame 12 and a bottom plate 13. Frame 12 is open at a top end and a bottom end. Bottom plate 13 is movable vertically within frame 12.

Frame 12 includes a pair of side plates **14*a* and a pair of end plates 14*b*. Frame components 15 surround side plates 14*a* and end plates 14*b* and connect them to each other. Frame components 15, side plates 14*a*, and end plates 14*b* form a rectangular opening at the top end and the bottom end of frame 12. A rim cushion 16, made of a soft, pliable material such as, for example, a sponge or foam rubber, pads the inner surface at the top end of frame 12. A bottom frame 17 for receiving bottom plate 13 is attached to the lower part of each end plate 14*b***.

Figure 8:
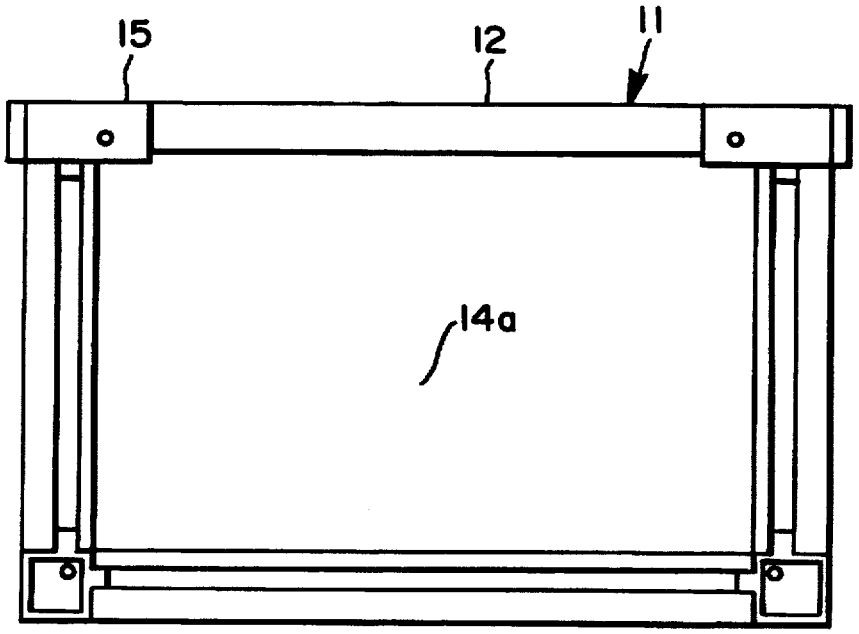
FIG. 8 is a front view of the container of FIG. 7.

FIG. 8 shows the exterior side of container 11.

Figure 9:
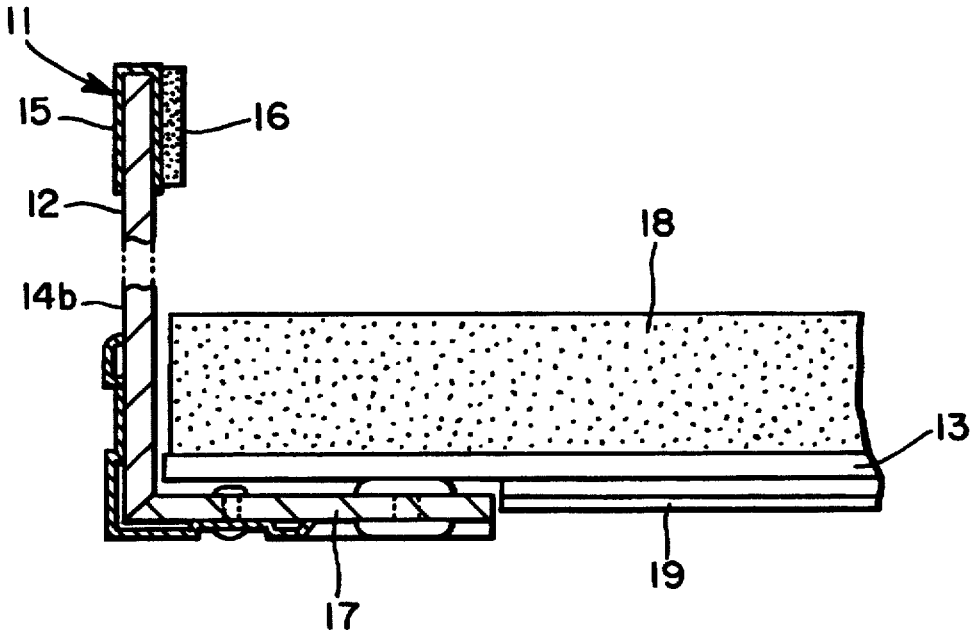
FIG. 9 is a sectional view of the container of FIG. 7 taken along the line X—X.

Referring to FIG. 9, bottom plate 13 rests in frame 12 on bottom frame 17. Bottom plate 13 is free to move up and down within frame 12. A bottom cushion 18, made of a soft, pliable material such as, for example, a sponge or foam rubber, is attached to an upper surface of bottom plate 13. Fitting portions 19, which corresponds to bottom frames 17, are attached to the underside of bottom plate 13.

Referring again to FIG. 5, the process of loading objects using object loading device 100 starts when first detecting means **95*a*, mounted immediately behind the object receiving position, detects that a container 11 is being moved toward the object receiving position. Actuation of downstream air cylinder 89 then causes downstream stopper 88 to project above the container conveying surface, preventing forward movement of container 11 from the object receiving position underneath hopper 23. When second detecting means 95*b*, at the downstream side of the object receiving position, detects the presence of container 11 at the object receiving position (when the forward side of container 11 is flush against downstream stopper 88), upstream air cylinder 93 actuates, rotating upstream stopper 90 to the up position, above the container conveying surface, so that container 11 is held at the object receiving position between downstream stopper 88 and upstream stopper 90**.

After first detecting means **95*a*, behind the object receiving position, detects that container 11 (the first container) has passed, and its location is clear, next container air cylinder 87 is actuated to project next container stopper 86 above the container conveying surface. Next container stopper 86 holds back a second container 30, following container 11. Second container 30 is prevented from abutting and interfering with container 11** which is being held in the object receiving position.

After first container 11 is secured at the object receiving position, elevator air cylinder 102 of bottom plate elevator 25 raises elevating board 101. Elevating board 101 urges bottom plate 13 of container 11 upward until bottom plate 13 is raised to a position near the top of container 11.

Referring again to FIG. 2, conveyor 21 conveys and discharges objects A (not shown in FIG. 2) into hopper 23. Objects A pass through chute 55 until they come to rest on shutters 22 that block the bottom of hopper 23. At that time, objects A are moved onto shutters 22 with a minimal drop impact, because they pass through inclined portion **34*b*** of conveyor 21 and inclined chute 55 before reaching shutters 22, which are also inclined. Since hopper cushion 54 and shutter plate cushion 64 are respectively attached to the inner surface of hopper 23 and the upper surface of shutters 22, the impact on objects A is further reduced by a buffer effect of hopper cushion 54 and shutter plate cushion 64.

Referring again to FIG. 3, when all of objects A to be loaded into container 11 are in position on shutters 22, shutter air cylinder 67 actuates opening the pair of shutters 22. Objects A on shutters 22 fall a short distance onto bottom plate 13 of container 11, which has been raised to a position closely below the bottom surface of shutters 22. The impact of objects A falling onto bottom plate 13 or objects A which are already on bottom plate 13 is very small because of the short distance they fall. Therefore, the impact on objects A is greatly reduced compared to the prior art.

After shutters 22 release objects A, elevator air cylinder 102 of bottom plate elevator 25 is actuated to lower elevating board 101, thereby lowering bottom plate 13 to the bottom of container 11.

Shutter air cylinder 67 actuates again to close shutters 22 in preparation for the beginning of the next loading cycle.

Referring to FIG. 5, upstream air cylinder 93 of container conveyor 24 rotates upstream stopper 90 to the down position, thereby moving it below the container conveying surface. Downstream air cylinder 89 and next container air cylinder 87 subsequently lower downstream stopper 88 and next container stopper 86 below the container conveying surface. Endless belt 80 moves first container 11 downstream while second container 30 that is to be the next to receive a load of objects A is carried toward the object receiving position.

As described above, objects A discharged from conveyor 21 come to rest on shutters 22 at the bottom of hopper 23 so that objects A are released for a very short fall when shutters 22 are opened. Thus, according to the configuration of the embodiment, objects are gently loaded into container 11. Furthermore, because bottom plate 13 of container 11, positioned below hopper 23, is raised by elevator air cylinder 102 to receive objects A, the drop of objects A from shutter 22 to bottom plate 13 of container 11 is short. Therefore, the impact of objects A on bottom plate 13 and/or with other objects A that are already on bottom plate 13 is reduced. Consequently, the invention protects objects A from dents and tears, when objects A are boxes or other paper and cardboard containers, and breakage when they are bottles or other glass and plastic containers.

Although in the preferred embodiment, shutters 22 are shown as two shutters which laterally open or close. The invention is not limited to that configuration. Other configurations, such as a single shutter which opens and closes or four shutters which slide or rotate in four directions to drop objects A into the center of container 11 may also be used. In addition, the shutters may be slidably, rotatably, or hingably connected. Such embodiments should be considered to fall within the scope and spirit of the invention.

Instead of air cylinders, an embodiment of the invention is contemplated in which electric solenoids are employed to move the holders and the elevating means. Another embodiment of the invention is contemplated in which small electric motors are employed to move the holders and the elevating means. Such embodiments should be considered to fall within the scope and spirit of the invention.

Figure 10:
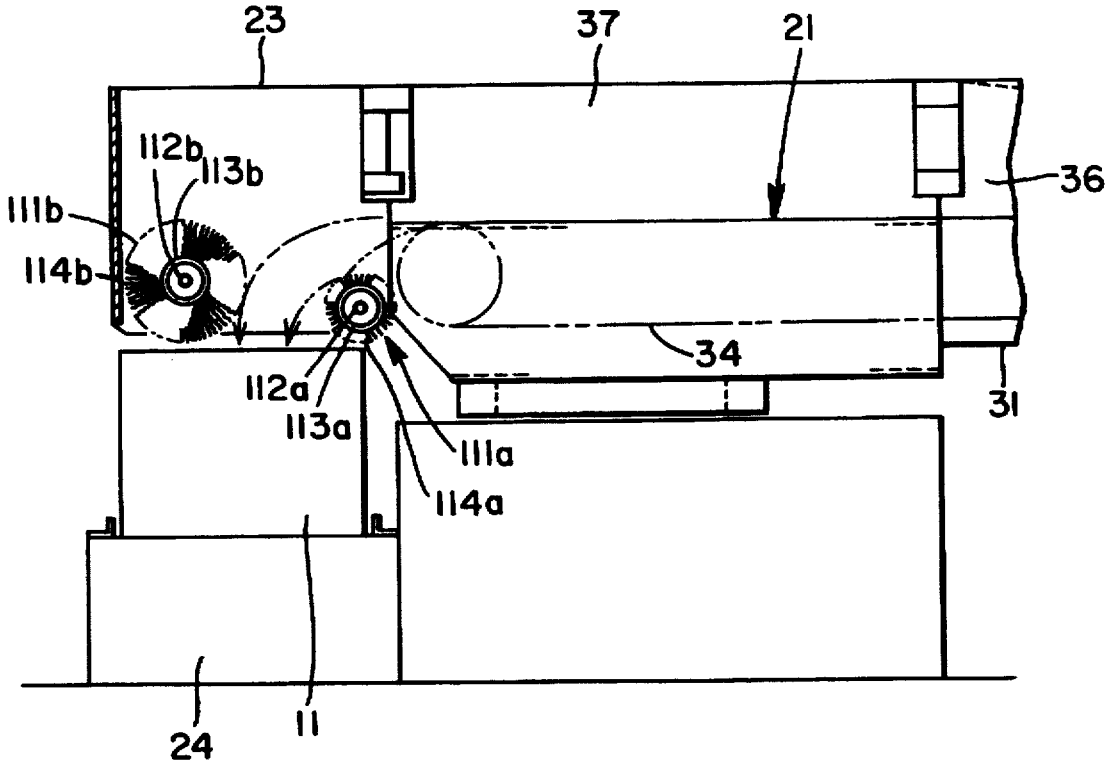
FIG. 10 is a sectional view of an object loading device according to another embodiment of the present invention.

Referring to FIG. 10, a second embodiment of the present invention includes a hopper 23 mounted at a forward end of the object conveying path of an object conveyor 21. A first buffer rotor 111*a* and a second buffer rotor 111*b* are mounted on an inner bottom surface of hopper 23.

First buffer rotor 111*a* and second buffer rotor 111*b* include a first cylindrical portion 113*a* and a second cylindrical portion 113*b*, respectively. First and second cylindrical portions 113*a* and 113*b* have first and second supporting shafts 112*a* and 112*b* along longitudinal axes thereof and projecting from both ends thereof, respectively. First and second resin brushes 114*a* and 114*b*, serving as buffer portions, or cushions, are formed around the outer cylindrical surface of first and second cylindrical portions 113*a* and 113*b*. First and second resin brushes 114*a* and 114*b* have bristles which project outward. The bristles of second resin brush 114*b* are longer than those of first resin brush 114*a*.

First buffer rotor 111*a* is mounted nearest the end of conveyor 21, at a location lower than the conveying surface of conveyor 21. First buffer rotor 111*a* extends parallel to the end of conveyor 21 and is rotatably supported by first supporting shaft 112*a*. First supporting shaft 112*a* is rotatably supported by hopper 23. Second buffer rotor 111*b* is mounted a sufficient distance forward from first buffer rotor 111*a* so that objects A may pass between first and second buffer rotors 111*a* and 111*b*. Second buffer rotor 111*b* is supported by its second supporting shaft 112*b*, also rotatably supported by hopper 23.

Objects A pass between first buffer rotor 111*a* and second buffer rotor 111*b* and fall into container 11. Container 11 is conveyed to a position underneath hopper 23 by a container conveyor 24.

Figure 11:
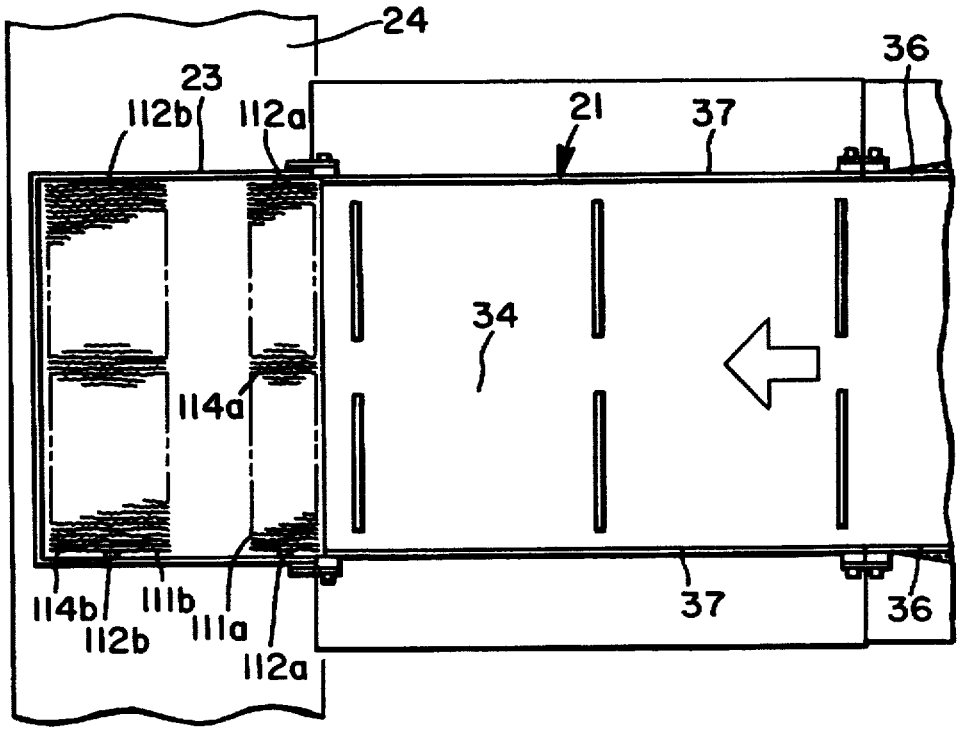
FIG. 11 is a top view of the object loading device of FIG. 10.
Figure 12A:
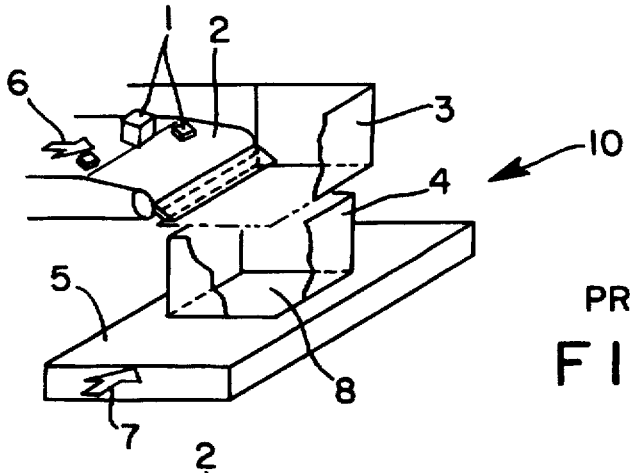
PRIOR ART FIG. 12a
FIG. 12*a* shows a conventional object loading system at the beginning of a loading cycle.
Figure 12B:
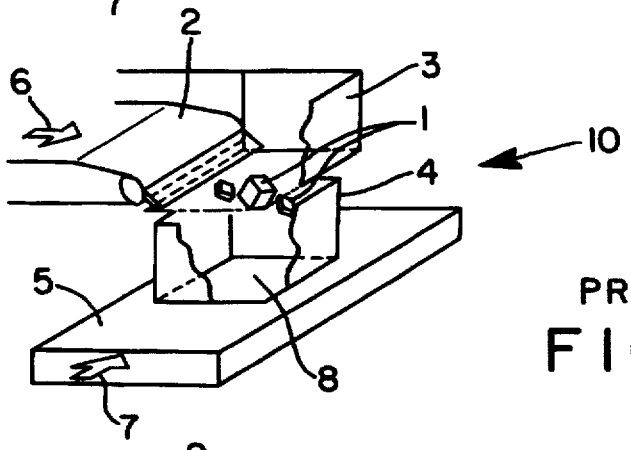
PRIOR ART FIG. 12b
FIG. 12*b* shows the object loading system of FIG. 12*a* with objects falling from an object conveyor directly into a container.
Figure 12C:
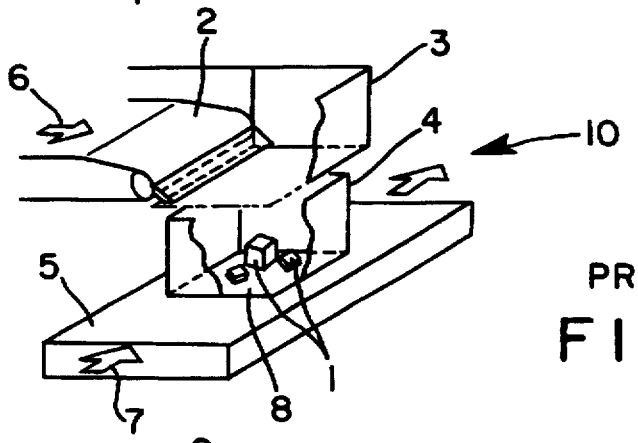
PRIOR ART FIG. 12c
FIG. 12*c* shows the object loading system of FIG. 12*a* with the objects loaded in the container.
Figure 12D:
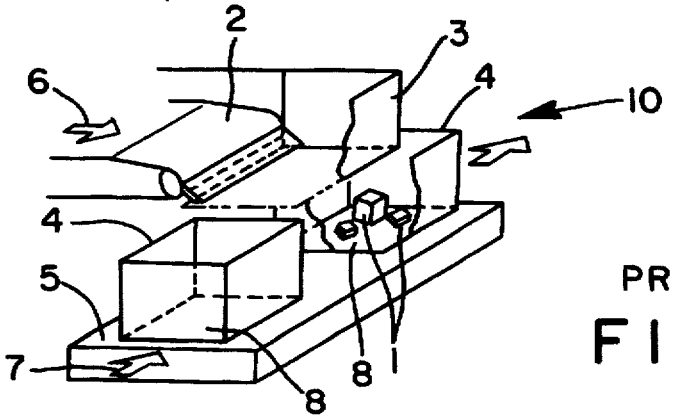
PRIOR ART FIG. 12d
FIG. 12*d* shows the loading system of FIG. 12*a* with a container conveying means removing a loaded container from the conveyor and moving an empty container toward the container.

Referring to FIG. 11, container conveyor 24 for conveying containers 11 to a position underneath hopper 23 extends perpendicularly to object conveyor 21.

With the above configuration, object conveyor 21 conveys objects A from the end of conveyor 21 into hopper 23 when objects A reach the forward end of conveyor 21. As objects A are discharged from conveyor 21, contact first buffer rotor 111*a* and second buffer rotor 111*b*. First and second buffer rotors 111*a* and 111*b* absorb the force with which the objects have been discharged, thus acting as a buffer or cushion. Objects A gently drop into container 11 in the manner of a free fall, after passing through first and second buffer rotors 111*a* and 111*b*.

This second embodiment, may also include a bottom plate 13 of container 11 raisable to receive objects A. As in the first embodiment, this reduces the drop distance of objects A from hopper 23 to bottom plate 13 of container 11 so that objects A are protected from damage and breakage.

In the second embodiment, first and second buffers rotor 111*a* and 111*b* are brushes. However, any other suitable cushioning materials, such as sponge or foam rubber materials are also applicable.

In both embodiments described above, the object conveyor is a belt conveyor. However, other devices such as, for example, a roller conveyor, a chute, a roller chute and so forth may also be used.

Having described the preferred embodiments of the invention with reference to the accompanying drawings, it is to be understood that the invention is not limited to those precise embodiments, and that various changes and modification may be effected therein by one skilled in the art without departing from the scope or spirit of the invention as defined in the appended claims.

What is claimed is:

1. An object loading device for loading objects into containers with an open top, comprising:

an object conveyor;

a hopper at an end of said object conveyor;

said hopper receiving objects conveyed by said object conveyor;

at least one flap movably mounted on a bottom portion of said hopper;

said flap being moveable between a closed position and an open position to selectively hold and release said objects in said hopper, respectively; and means for positioning a container below said hopper to receive said objects.

2. The object loading device of claim 1, wherein at least one flap includes a plurality of flaps.

3. The object loading device of claim 1 wherein said means for positioning includes a container conveyor.

4. The object loading device of claim 2 wherein said plurality of flaps are slidably mounted on said bottom portion of said hopper.

5. The object loading device of claim 1, wherein said hopper further includes a cushioning material on interior surfaces thereof.

6. The object loading device of claim 1, wherein;

said containers have a bottom plate; and said means for positioning includes means for moving said bottom plate upward and downward within said container.

7. The object loading device of claim 6, wherein interior surfaces of said containers are made of a cushioning material.

8. The object loading device of claim 1, wherein inner wall surfaces and bottom plates of said containers include a cushioning material.

9. The object loading device of claim I wherein:

said at least one flap includes a plurality of flaps; and means for moving said plurality of flaps away from each other to permit said objects to drop therepast into said container.

10. The object loading device of claim 1 wherein said at least one flap is slidably mounted on said bottom portion of said hopper.

11. An object loading device for loading objects into a container having an open top, comprising:

an object conveyor;

a hopper mounted at an end of said object conveyor;

said hopper receiving objects conveyed by said object conveyor;

a first roller and a second roller rotatably supported along a bottom of said hopper;

said first roller and said second roller having a cushioning material on exterior surfaces of said first and said second rollers;

a distance between said first and second rollers being large enough for said objects to pass between them; and a container conveyor.

12. The object loading device of claim 11, wherein said cushioning material is made of bristles.

13. The object loading device of claim 12, wherein said hopper further includes a cushioning material on interior surfaces of said hopper.

14. The object loading device of claim 11, wherein said hopper further includes a cushioning material on interior surfaces of said hopper.

15. The object loading device of claim 11, wherein;

said containers include a bottom plate which is moveable in an upward direction within said container; and said container conveyor includes a bottom plate lifter, which pushes said bottom plate toward said hopper, at a position underneath said hopper.

16. The object loading device of claim 15, wherein interior surfaces of said containers are made of a cushioning material.

17. The object loading device of claim 11, wherein interior surfaces of said containers are made of a cushioning material.

18. The object loading device of claim 11, wherein said first and second rollers are mounted parallel to each other and perpendicular to a conveying path of said object conveyor.

19. An object loading device for loading objects into containers having a moveable bottom plate and an open top, comprising:

an object conveyor;

a hopper mounted at a forward end of said object conveyor;

said hopper receiving objects conveyed by said object conveyor;

a container conveyor;

means for holding a container on said container conveyor in a receiving position aligned below said hopper; and a lifting mechanism which lifts said moveable bottom plate toward said hopper when said container is in said position aligned below said hopper.

20. The object loading device of claim 19, wherein interior surfaces of said hopper and interior surfaces of said container are made of a cushioning material.

21. A method of loading objects into a container comprising the steps of:

transporting said objects to a hopper;

retaining said objects in said hopper;

positioning said container underneath said hopper;

raising a bottom plate of said container toward a raised position underneath said hopper;

releasing said objects through an opening in a bottom portion of said hopper onto said bottom plate in its raised position;

lowering said bottom plate back down to a bottom of said container.

22. A method of loading objects into a container comprising the steps of:

positioning said container underneath a hopper;

raising a bottom plate of said container toward said hopper;

transporting objects to said hopper;

transporting objects through cushioned rollers in said hopper; and lowering said bottom plate to a bottom of said container.

* * * * *